J. I. RODWAY & J. ESSON.
MEANS FOR AUTOMATICALLY INFLATING TIRES OF VEHICLE WHEELS WHILE IN MOTION.
APPLICATION FILED DEC. 2, 1910.

1,016,364.

Patented Feb. 6, 1912.

UNITED STATES PATENT OFFICE.

JOHN INSHAW RODWAY AND JAMES ESSON, OF JOHANNESBURG, TRANSVAAL.

MEANS FOR AUTOMATICALLY INFLATING TIRES OF VEHICLE-WHEELS WHILE IN MOTION.

1,016,364. Specification of Letters Patent. Patented Feb. 6, 1912.

Application filed December 2, 1910. Serial No. 595,204.

*To all whom it may concern:*

Be it known that we, JOHN INSHAW RODWAY, cycle agent, and JAMES ESSON, engineer, both subjects of His Majesty the King of Great Britain, and both residing at 67 Bree street, Johannesburg, in the Colony of the Transvaal, South Africa, have invented certain new and useful Improvements in Means for Automatically Inflating the Tires of Vehicle-Wheels While in Motion; and we do hereby declare the following to be a full, clear, and exact description of the invention, such as will enable others skilled in the art to which it appertains to make and use the same.

This invention relates to that class of apparatus for automatically inflating the tires of vehicle wheels while in motion, which comprises an inflater connected and rotating with the hub and automatically operated as the wheel revolves by a fixed cam surface which acts on its piston rod to thrust it in inward, (return motion being effected by a spring) so that as the wheel revolves air is continuously pumped into the tire through a tube leading thereto from the inflater barrel. Such apparatus further comprises means whereby the piston rod of the inflater is automatically held locked out of action when a predetermined tire pressure is reached, said means being operated by the air pressure in the tire, and sometimes comprising an air bulb which when expanded brings a bolt or catch into action.

Our invention comprises an improved construction and arrangement of clutch device for automatically locking the inflater piston rod out of action when the desired tire pressure is attained; and to improved means for automatically operating the said clutch device; the object being to provide a clutch device extremely sensitive in action and which will grip and release the piston rod immediately the air pressure exceeds or falls below a predetermined point, there being practically no lost motion.

Our invention will be clearly understood on referring to the annexed drawings in which—

Figure 1:
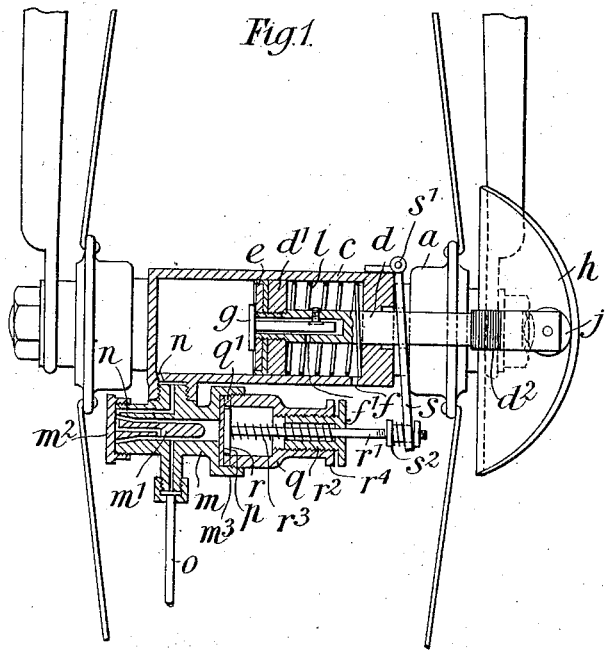
Figure 2:
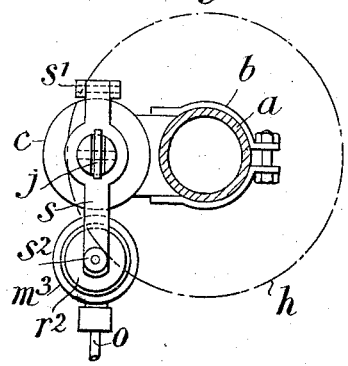
Figure 3:
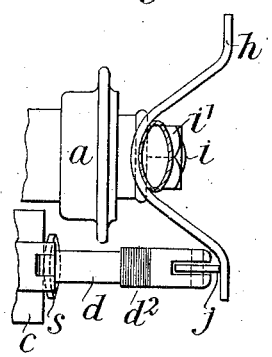

Figure 1 shows in sectional elevation automatic inflating means applied to a bicycle wheel hub in accordance with our invention; Fig. 2 is an end view of the inflater and locking device as seen from the right of Fig. 1; and Fig. 3 is a plan view of a part of Fig. 1 showing the cam surface and inflater plunger engaged thereby.

Similar letters refer to corresponding parts in all the figures.

Suitably secured to the hub $a$ of the wheel, as by the clip $b$, is the inflater barrel $c$ whereof the piston rod $d$ reciprocates in a direction parallel with the axis of $a$. In front of the piston $d'$ of the piston rod is mounted in the usual way the cup leather $e$. Air enter the inflater barrel at $f$ and passes to the front of the cup leather in the ordinary manner, as through the passage $f'$ in the piston rod, $g$ being a non-return valve whose stem enters the passage $f'$ and which operates in the well known way.

$h$ is a fixed cam surface here shown as consisting of a suitably bent disk secured to the axle $i$ of the wheel by the nut $i'$, and $j$ is an antifriction roller mounted in the slotted end of the piston rod $d$ which roller is held in contact with said cam surface by the tension spring $l$ whereof one end is secured to the piston $d'$ and the other to the cover of the inflater barrel $c$. The piston $d'$ is thus automatically reciprocated twice for each revolution of the wheel, being forced inward by the cam surface $h$ and returned by the spring $l$.

Fixed to the side of the inflater barrel is a chamber $m$ fitted with a non-return valve $m'$, preferably of the type commonly used with pneumatic tires (the rubber valve sleeve being omitted for clearness) said valve being held in place in the chamber $m$ by the screw cover or cap $m^2$. Air from the inflater barrel is forced into the chamber $m$ by way of the passage $n$ and the valve $m'$, and from thence passes to the tire by the tube $o$. The inner end of the chamber $m$ is closed by a diaphragm or rubber disk $p$ seated within an internally screwed socket $m^3$ provided on the end of said chamber, and held down in place by the hollow head $q$ which screws into said socket, a metal washer $q'$ being interposed between the head $q$ and the diaphragm $p$. The air pressure of the tire acts constantly on the diaphragm $p$ which operates the automatic lock as hereinafter described. Bearing on the rear of the diaphragm $p$ is a metal disk $r$ from the center of which extends the rod $r'$ which passes through the gland $r^2$ screwed into the outer end of the head $q$. By the spring $r^3$ held in compression between the disk $r$ and the gland the said disk is kept pressed against the rubber disk or diaphragm $p$, the pressure of the spring being regulated by the said screw gland. $r^4$ is a lock nut for the latter.

Pivoted to the inflater barrel at $s'$ is a clutch lever $s$ having an aperture through which the piston rod $d$ passes. This aperture is of such size that when the clutch lever is substantially at right angles with the piston rod the latter will slide freely within the said aperture, while when the lever $s$ is canted the piston rod will be firmly gripped by the sides of said aperture and locked against movement. The slightest motion of the clutch lever causes it to grip or release the piston rod there being practically no lost motion, as in the case with a locking bolt or catch. The free end of the clutch lever $s$ is adjustably connected with the rod $r'$ as by the sleeve $s^2$ screwing onto the end of said rod and engaging the end of the clutch lever.

It will be noted that the piston rod $d$ is of larger diameter toward its outer end, this prevents it from being gripped by the clutch lever except when the piston is completely retired within the barrel. The enlarged end of the piston rod is further furnished with grooves $d^2$ or externally roughened to give the clutch lever a better grip.

When the wheel is running air is continuously pumped into the tire as before described, and when the predetermined pressure is reached, the pressure distorts the diaphragm $p$ thereby forcing outward the rod $r'$ and causing the clutch lever $s$ to grip the enlarged end of the piston rod $d$ when the piston has been fully retired into the barrel. When the air pressure falls again, the diaphragm is returned to its normal condition by the spring $r^3$ drawing back the rod $r'$ and releasing the clutch lever. The pressure at which the locking device will come into action is determined by adjusting the stress of the regulating spring $r^3$ by the screw gland $r^2$.

What we claim and desire to secure by Letters Patent of the United States is:—

1. In a device of the character described, the combination with a pump including a barrel and a piston rod, of means for reciprocating the piston rod, a clutch lever having an aperture through which the piston rod is adapted to slide, and means to cant said clutch lever whereby the sides of the aperture therein will engage the piston when the latter is retired within the barrel and lock the pump against operation.

2. In a device of the character described, the combination with a pump including a barrel and a piston rod having its projecting end of enlarged diameter and a portion thereof roughened, of a cam for reciprocating the piston rod, a pivotally mounted clutch lever provided with an aperture through which the piston rod is adapted to slide when the clutch lever is substantially at right angles with the piston rod, and automatically operated means to cant said clutch lever whereby the sides of the aperture therein will engage the roughened enlarged portion of the piston rod when the latter is retired within the barrel and lock the pump against operation.

3. In a device of the character described, the combination with a pump adapted to deliver fluid under pressure to a pneumatic tire said pump including a barrel and a piston rod reciprocable therein, of means for reciprocating said piston rod, a pivotally mounted clutch lever provided with an aperture through which the piston rod is adapted to slide, a chamber interposed between the pump barrel and the pneumatic tire, and a rod adapted to be moved outwardly from said chamber when the pressure in the tire exceeds a predetermined amount, said rod having one end connected to one end of the clutch lever whereby the latter may be canted and the sides of the aperture therein caused to engage said piston rod when the latter is retired within the pump barrel and lock the pump against operation.

4. In a device of the character described, the combination with a pump adapted to deliver fluid under pressure to a pneumatic tire said pump including a barrel and a piston rod having its projecting end of enlarged diameter, of means for reciprocating the piston rod in the pump barrel, a pivotally mounted clutch lever provided with an aperture through which the piston rod is adapted to slide when the clutch lever is substantially at right angles with the piston rod, a chamber interposed between the pump and the tire and communicating with both thereof, a socket secured to the chamber, a rod reciprocable in said socket and having one end thereof operatively connected with one end of said clutch lever, and a flexible diaphragm at the other end of said rod and adapted to be acted on by pressure from within said chamber.

In testimony whereof we have hereunto set our hands in the presence of two witnesses.

JOHN INSHAW RODWAY.
JAMES ESSON.

Signed by the above named John Inshaw Rodway in the presence of—
ERNEST HARKER,
ETHEL M. WEBB.

Signed by the above named James Esson in the presence of—
HUGH DU AOUG WILFRED,
ISAAC KESSEL.